US009552532B2

(12) United States Patent
Akagunduz

(10) Patent No.: US 9,552,532 B2
(45) Date of Patent: *Jan. 24, 2017

(54) SYSTEM AND METHOD FOR DESCRIBING IMAGE OUTLINES

(71) Applicant: Aselsan Elektronik Sanayi ve Ticaret Anonim Sirketi, Ankara (TR)

(72) Inventor: Erdem Akagunduz, Ankara (TR)

(73) Assignee: Aselsan Elektronik Sanayi ve Ticaret Anonim Sirketi, Ankara (TR)

( * ) Notice: Subject to any disclaimer, the term of this patent is extended or adjusted under 35 U.S.C. 154(b) by 471 days.

This patent is subject to a terminal disclaimer.

(21) Appl. No.: 14/130,544

(22) PCT Filed: Apr. 1, 2013

(86) PCT No.: PCT/IB2013/052598
§ 371 (c)(1),
(2) Date: Jan. 2, 2014

(87) PCT Pub. No.: WO2014/162168
PCT Pub. Date: Oct. 9, 2014

(65) Prior Publication Data
US 2016/0110627 A1    Apr. 21, 2016

(51) Int. Cl.
G06K 9/48    (2006.01)
G06T 3/40   (2006.01)
G06T 5/10   (2006.01)
G06T 7/00   (2006.01)

(52) U.S. Cl.
CPC ............... *G06K 9/481* (2013.01); *G06K 9/48* (2013.01); *G06T 3/40* (2013.01); *G06T 5/10* (2013.01); *G06T 7/004* (2013.01); *G06T 2207/20024* (2013.01)

(58) Field of Classification Search
CPC ........... G06K 9/48; G06K 9/6201; G06T 5/10; G06T 7/004; G06T 3/40
See application file for complete search history.

(56) References Cited

U.S. PATENT DOCUMENTS

| 5,751,853 A | 5/1998 | Michael |
| 9,135,522 B2 * | 9/2015 | Akagunduz .............. G06K 9/48 |
| 2003/0194135 A1 | 10/2003 | Wenzoe |

(Continued)

FOREIGN PATENT DOCUMENTS

GB    2393012    3/2014

*Primary Examiner* — Gregory M Desire
(74) *Attorney, Agent, or Firm* — Gokalp Bayramoglu

(57) ABSTRACT

The present invention relates to the field of image processing and methodologies to construct a descriptor from binary silhouette images. The method comprises the steps of; receiving a parametric equation of a closed planar curve, choosing nodes on the closed planar curve with equal intervals, generating a continuous scale space of the nodes on the curve by successively convolving the planar curve with a Gaussian filter and down-sampling it after each octave, calculating orientation vectors and orientation angle values for each sampled point at each interval of each octave, creating a orientation scale space (OSS) which is a matrix obtained from stacking each orientation angle value on top of each other, representing the outline with a descriptor including all the orientation vectors and their respective parameters position and scale.

14 Claims, 6 Drawing Sheets

(56) References Cited

U.S. PATENT DOCUMENTS

Figure 1:
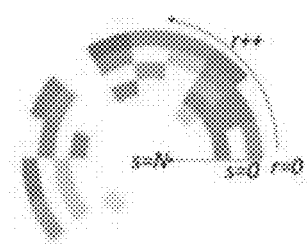

| | | | |
|---|---|---|---|
| 2004/0208396 A1* | 10/2004 | Gunther | G01C 11/04 382/294 |
| 2006/0023933 A1 | 2/2006 | Mitsui | |
| 2006/0104544 A1* | 5/2006 | Chaudhury | G06T 3/0081 382/299 |
| 2012/0166135 A1* | 6/2012 | Ing | G01N 29/4472 702/142 |
| 2013/0148860 A1* | 6/2013 | Musatenko | G06K 9/6206 382/107 |
| 2016/0110627 A1* | 4/2016 | Akagunduz | G06K 9/48 382/197 |

\* cited by examiner

SYSTEM AND METHOD FOR DESCRIBING IMAGE OUTLINES

FIELD OF THE INVENTION

The present invention relates to the field of image processing and methodologies to construct a descriptor from binary silhouette images.

BACKGROUND OF THE INVENTION

It is known that there are methods and models to identify an object (or equivalently a "target") on a still image or a video frame. Such methods are used for example in infrared search and track (IRST) systems in which there is a sensor acquiring an infrared image of the scene under consideration and generally these images are converted into a greyscale format. This image consists of a two dimensional array of pixels which represent the infrared intensity at various locations. Currently there are systems and methods to extract and match features of the outlines of the input objects. These systems are used for example to determine a target of a known type and it will then be possible to interpret it accordingly. In such a method, it is desirable to represent different outlines efficiently to be able to store them in less space and speed the searching process up.

One such known method uses a curvature scale space (CSS) wherein the outline of the object which is a closed curve is used to generate the CSS. For this purpose, another initial calculation to fit a curve on the contour of the object is generally applied on a binary silhouette image of the object under consideration. In this known method, circle of curvature values are calculated over the closed curve and object descriptors are derived from a scale space representation of the outline. These are represented by graphs and peak values on this graph are used as feature parameters. Using such a representation, various shapes on images can be identified, matched or aligned. One of the main problems with the CSS method is that, it relies on the starting point of calculations on the silhouette curve. Since the silhouette is a closed curve around the object on an image, it does not have a defined starting point and this constitutes a problem when it is required to match or recognize outlines. As a solution to this problem, the peak values are currently being used for matching shapes, which is sensitive to noise and incorrect segmentation of outlines. When the outline is extracted with slight errors, the results may vary significantly with such an approach.

Another currently used method implements an ordering among the peaks on the graph acquired by the CSS technique. For example, peak coordinates are ordered with respect to the peak heights in a current implementation. Yet another technique is using the maximum peak as the starting point and representing the outlines starting from that peak. Again, these methods are prone to noise and incorrect segmentation or incorrect curve fitting.

The well known scale invariant feature transform (SIFT) method on the other hand, uses a scale space representation of a two dimensional (2D) greyscale image and generally the representative features of objects on the pixel image are found by computing difference of Gaussian images forming the scale space. Using this two dimensional method, various objects on pixel images can be represented by a list of salient points, can be compared, identified or matched. Disadvantages of the CSS outline feature extraction methods and the inability of the SIFT methods to find feature points representing only the outline of an object necessitate a new method. In some applications such as infrared imaging systems, targets or objects on the image generally have its features on its outline. Furthermore some objects do not require a complete representation but can be identified by only its outline. Storing feature points only on the outline takes less space and searching and matching will be much faster.

The current methods are not offering a reliable and efficient way of extracting, representing and matching silhouette image contour features on their own and a new methodology is introduced in this document.

The British patent document GB2393012, an application in the state of the art, discloses a method for searching a two-dimensional outline and comprises inputting a query, deriving a descriptor of said outline from a curvature scale space representation of the outline of the object, wherein the peak co-ordinate values of the CSS representation are ordered on the basis of the peak height values.

The United States patent document U.S. Pat. No. 7,430,303, an application in the state of the art, discloses a method for extracting and matching gesture features of image wherein a closed curve formed by a binary contour image of the gesture image is used to form curvature scale space (CSS) image and feature parameters are determined by extracting first plural peaks.

The United States patent document U.S. Pat. No. 6,711,293, an application in the state of the art, discloses a method and apparatus for identifying scale invariant features in an image by producing a plurality of difference images, blurring an initial image to produce a blurred image and subtracting the blurred image from the initial image to produce the difference image.

The application titled "System and Method for Identifying Scale Invariant Features of Object Outlines on Images" and numbered PCT/IB2012/050883 mainly focuses on extracting scale invariant features from closed planar curves (silhouettes) and representing these features on "silhouette feature histograms". Three main steps in the system and method may be defined as: curve extraction, feature extraction and descriptor construction.

Curve extraction step includes fitting a continuous curve on the contours of the silhouette and arc-length sampling this continuous curve. The next step, feature extraction includes curvature scale space construction and feature selection in this scale-space. The final step, descriptor construction uses the extracted frames as pixels on a rectangular (or radial) image, in which location of each pixel designates feature positions (over the curve) and scales (in the curvature scale space) and colour of each pixel represents the orientation of each feature (on the curve plane). In this final step, these images are matched to each other with a rotation and starting invariant manner, so as to accomplish object recognition tasks.

The technique gives satisfactory results. However due to the nature of the technique, the obtained features are generally extracted from the high curvature regions over the planar curve. Thus, lesser number of features is extracted from relatively smoother silhouettes. In this occasion, the descriptor image becomes sparse (including mostly empty pixels) since number of extracted features is relatively low. Matching two descriptor images with relatively different feature densities, in other words matching two silhouettes, one of which is smoother and the other is much curly, may become inefficient.

SUMMARY OF THE INVENTION

In order to solve inefficiency the problem, the feature extraction step (the second step) of the technique may be altered, such that a constant number of features are extracted from the overall silhouette and all scale levels. Then the descriptor image will be fully dense and matching problem between two different silhouettes become more efficient.

For this purpose, a new technique is proposed. The new technique consists of the same first and third steps as the application titled "System And Method For Identifying Scale Invariant Features Of Object Outlines On Images". However the second step, feature extraction, is altered such that orientation angles are extracted from all sampled points of all scale levels of the curve. The orientation angle is the angle between the orientation vector and the x-axis, where the orientation vector is the unit vector perpendicular to the tangential line at that point. Using the scales, positions and orientations of all points at all scale levels; the same descriptor given in the third step of the previous technique is constructed. This new descriptor includes no empty pixels.

An objective of the present invention is to provide a methodology for extracting, representing and matching silhouette image contour orientations reliably and efficiently independent of scale and resolution of the silhouette image.

Another objective of the present invention is to provide a methodology for extracting, representing and matching silhouette image with a fully saturated descriptor.

The similar steps—feature extraction—of the application titled "System and Method for Identifying Scale Invariant Features of Object Outlines on Images" and the present application has further differences. Number of the selected features from scale space is not predictable in the application number PCT/IB2012/050883 document. There is an example (FIG. 1) of a descriptor below, created from the unpredictable number of features;

The unpredictability causes empty pixels in the descriptor.

However number of the selected features (orientation angles) is extracted from all sampled points of all scale levels of the curve is decided by the user. In one embodiment of the present application the mentioned number is 512. There is an example (FIG. 2) of a descriptor which is fully saturated;

The present application is proposed for overcoming the technical problem of lesser features and empty pixels, which is observed in FIG. 1. With new proposed technique, although descriptor construction steps are the same, constructed descriptors exactly different as it seen from FIG. 1 and FIG. 2.

Figure 3:
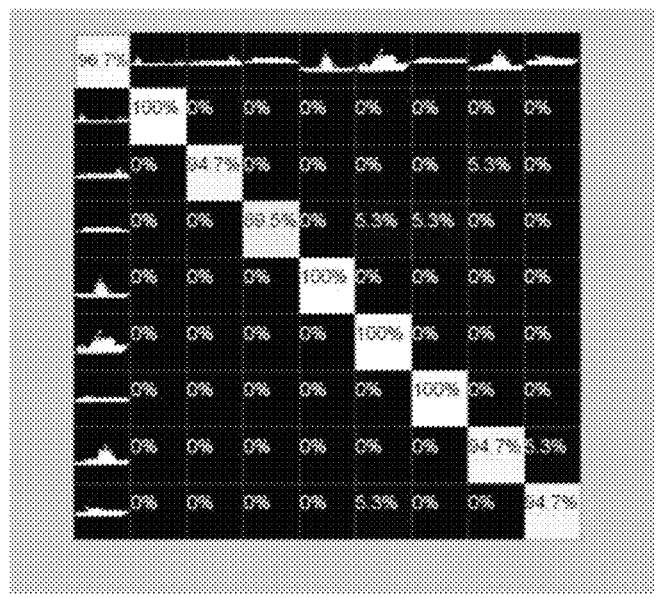
Figure 4:
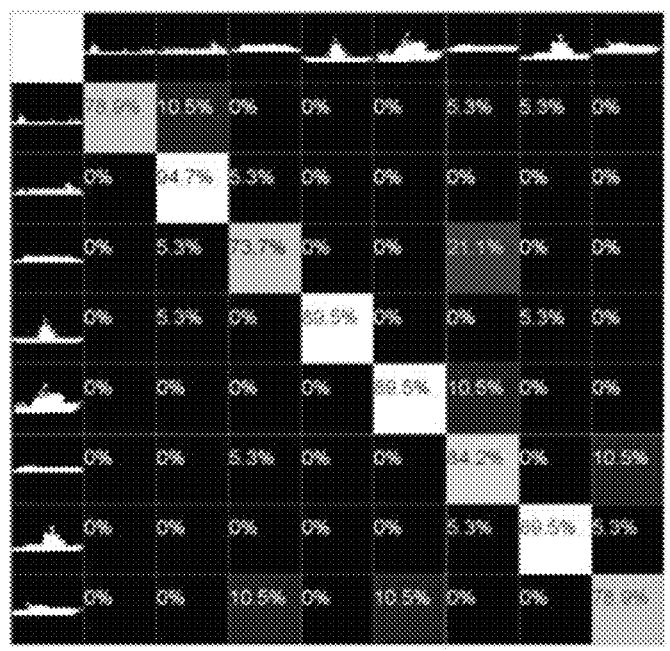

When the techniques of the of the application titled "System and Method for Identifying Scale Invariant Features of Object Outlines on Images" and the present application executed on the same database, the below graphical results are obtained;

FIG. 3 shows the results of the new proposed technique and FIG. 4 shows the results of the early application. These results are obtained from a database which has 8 ship silhouettes and results of the new technique are much more successful. Examples and graphics will be more comprehensible when detailed description is read.

DETAILED DESCRIPTION OF THE INVENTION

Figure 2:
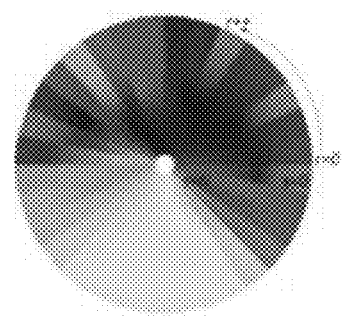
Figure 5:
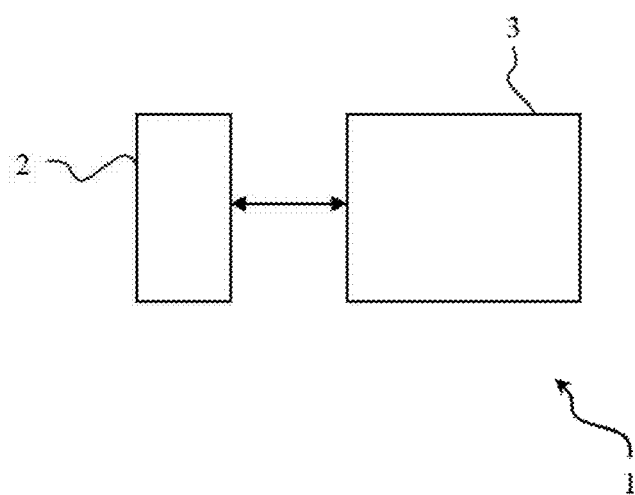
Figure 6:
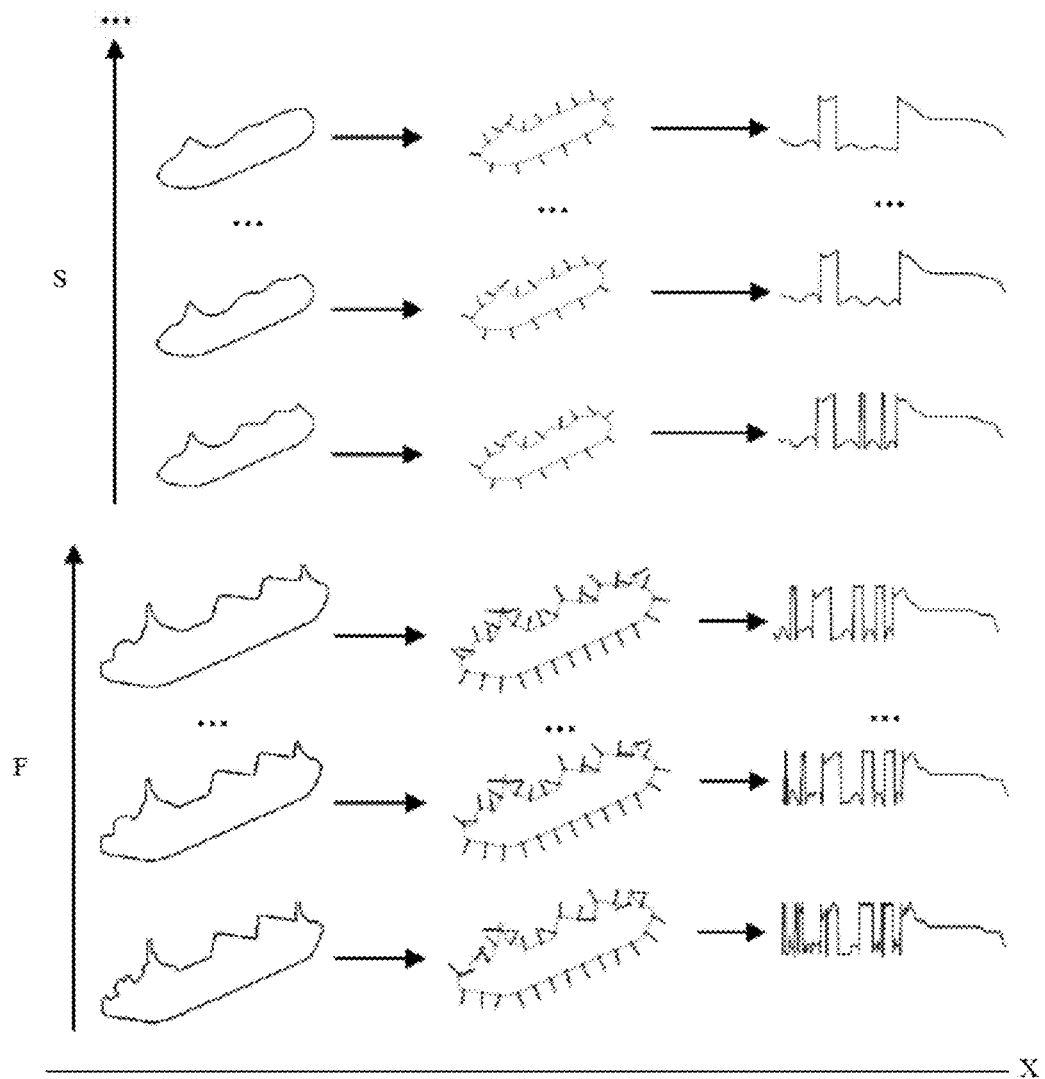
Figure 7:
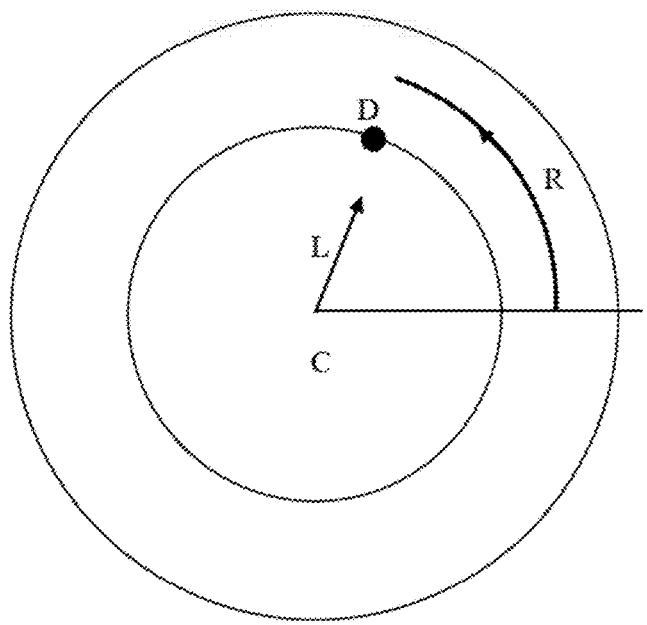
Figure 8:
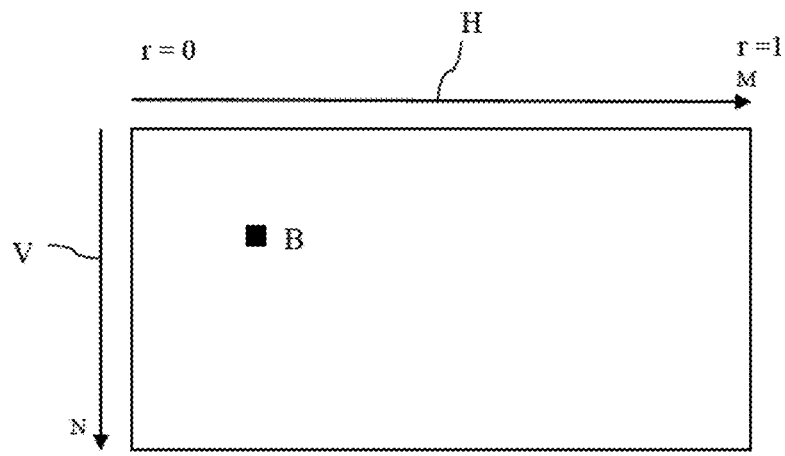
Figure 9:
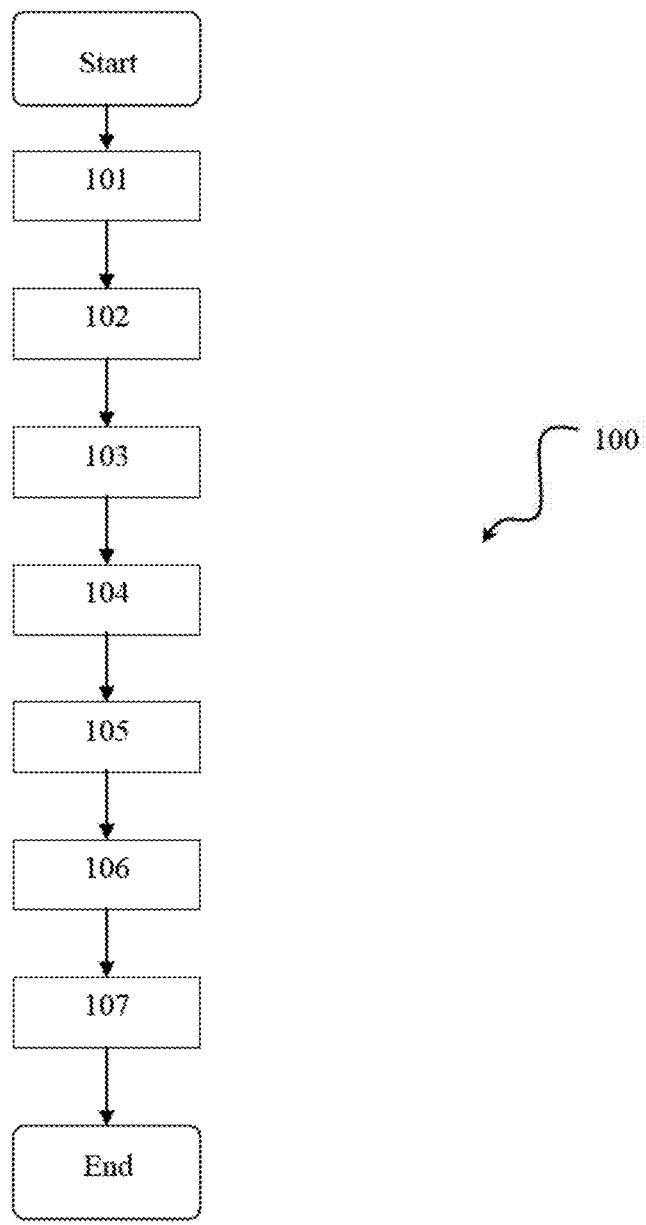

A system and method realized to fulfill the objective of the present invention is illustrated in the accompanying figures, in which:

FIG. 1 shows an example of a descriptor.
FIG. 2 shows an another example of a descriptor which is fully saturated.
FIG. 3 shows the results of the present invention.
FIG. 4 shows the results of the prior art.
FIG. 5 is the schematic view of the preferred embodiment system.
FIG. 6 is a drawing of two representative octaves, their respective scale spaces, orientation vectors and orientation scale space graphic.
FIG. 7 is a schematic radial descriptor extracted for a single point according to the present invention.
FIG. 8 is a schematic rectangular descriptor extracted for a single point according to the present invention.
FIG. 9 is the flowchart of the preferred method of the present invention.

The components illustrated in the figures are individually numbered where the numbers refer to the following:
1. System for describing image outlines
2. Feature and image database
3. Processing unit
C. Center point
D. Dot
F. First octave
L. Scale level direction
S. Second octave
R. Curve parameter direction
X. X-axis
B. Bin
H. Horizontal axis
V. Vertical axis
100. Method for describing image outlines A method for describing image outlines (100) fundamentally comprises the following steps.
- receiving a parametric equation of a closed planar curve (101),
- choosing nodes on the closed planar curve with equal intervals (102),
- generating a continuous scale space of the nodes on the curve by successively convolving the planar curve with a Gaussian filter and down-sampling it after each octave (103),
- calculating orientation vectors and orientation angle values for each sampled point at each interval of each octave (104),
- creating a orientation scale space (OSS) which is a matrix obtained from stacking each orientation angle value on top of each other (105),
- representing the outline with a descriptor including all the orientation vectors and their respective parameters position and scale (106).

First, a parametric equation of a closed planar curve is received which represents the outline of the shape which will be matched, identified, or represented with a descriptor is received in step (101). In the case of an infrared search and track (IRST) system, raw input data will be a two dimensional grey scale pixel image, each pixel representing the infrared density for that location in the scene under consideration. To be able to find the outline of an object (or equivalently a target) on an image, a simple approach is representing it as a binary image by pre-processing it using a cutout filter. There are known methods and algorithms to generate a binary image, in which the object is represented only by its shadow or silhouette (a black area on a white background) and these are easy to apply on infrared grayscale images. These real world problems usually provide signals in discrete form, such as a binary silhouette pixel image. When it is required to represent its features independent of scale and resolution, a continuous representation is needed and if a continuous representation is required, the silhouette must be fitted to a curve model, like a spline or polynomial.

Although this operation is trivial the choice of the fitting method and related parameters are crucial. In a preferred configuration of the present inventive method, chain coding, a representation of neighbouring pixels on an image outline. [Freeman Chain code 1961] is used to fit silhouettes in binary images into closed B-splines. The chain codes denote the actual distance between two pixels (1 or $\sqrt{2}$ units), and these distances are used when fitting a k-order B-spline to the given silhouette, finding its outline. A continuous representation of the silhouette is necessarily required because using a uniformly sampled set of points of the closed curve enables us to construct a uniform scale-space of the signal.

The pixels belonging to the input silhouette is not uniformly sampled over the curve and number of pixels is arbitrary and this requires preferably constant number of points sampled on the fitted spline curve and one may obtain a uniformly sampled point set of any number of points from a spline function which is done in a step (102). The curve which represents the outline of the shape is a closed planar curve meaning that it starts and ends at the same point forming a loop around the silhouette under consideration and represents points on the same plane. In step (102) the curve is divided into equal sections with "nodes" or sample points at each division position. The number of divisions may depend on the resolution of the initial image (silhouette image) since overdoing the division for a low resolution image will not improve results but increase the complexity. The closed parametric spline function will give the position along the respective outline given a parameter (which is a real number between 0 and 1 intuitively) and every node will have a value with respect to this parameter.

A continuous scale space of the nodes on the curve is generated in step (103). This may seem similar to the previous CSS methods but feature extraction and related intermediate steps differ greatly.

In a preferred configuration, the planar curve is down-sampled into half generating at least one octave. In the case of a closed parametric curve, down-sampling is applied by decreasing the number of the equally separated sample points (nodes). In a preferred configuration, nodes are eliminated by skipping one node along the curve meaning that all of the odd or even nodes are discarded. Throughout each octave, a continuous scale space is generated by convolving the planar curve with a Gaussian filter in a preferred embodiment. The scale space of the curve will then be constructed, and in fact this whole scale space can be made a continuous scale space when the number of scales is adjusted so that between each octave the scale gap is preferably the same as Gaussian filtering within octaves. The Gaussian filter is applied along the planar curve and thus is a single row filter with standard deviation $\sigma$ (the curve is actually one dimensional with a determined starting point and a single parameter). Since the original curve is a closed one, a starting point must be indicated beforehand. Referring to FIG. 4, first column represents the outline for each scale, the nethermost being the original input outline. As the input outline is convolved with Gaussian filters, higher scales are obtained and the first octave (F) is generated. The second octave (S), is again generated using the initial outline which is down-sampled into half meaning that there are less nodes in the outlines of the second octave (S). Sub-scales of the second octave (S) are generated by further convolving the down-sampled outline. This scale space generation is repeated for further octaves as required using the down sampled outline of the previous octave as a starting outline for the next one. With a correct arrangement of down-sampling and filtering parameters, as mentioned above, a continuous scale space is generated.

The scale space of a curve $L(r,\sigma)$ is defined as;

$$L(r,\sigma)=g(r,\sigma)*C(r)$$

$L(r,\sigma)$ is the convolution of the variable-scale Gaussian function $g(r,\sigma)$ with the parametric curve $C(r)$.

The next step is calculating orientation vectors and orientation angle values for each sampled point at each interval of each octave (104). Referring to FIG. 6, the middle column shows the orientation vectors calculated for each sampled point at each interval of each octave.

Orientation angle at a sampled point is defined as the angle between the orientation vector and the x-axis (X), where the orientation vector is the unit to the tangential line at that point. Orientation angle value is calculated as follows;

$$O(r)=\text{atan }2(-\dot{x}(r),\dot{y}(r))$$

$\dot{x}$ and $\dot{y}$ denote the first derivatives of the x and y components of $C(r)$ along the curve parameter r. Since $O(r)$ can take values from 0 to $2\pi$ radians, atan 2 function is used.

For each octave of the scale-space, the initial curve is repeatedly convolved with Gaussians to produce the set of scale-space curves shown on left column of FIG. 6. After each octave, the curve is down-sampled into half, and the process is repeated. Then the orientation vectors for each sampled point are calculated (middle column on FIG. 6). By this way, the scale-space of the orientation vectors is obtained.

The final scale space, from which the local information will be extracted, is obtained from stacking each orientation angle value on top of each other (105). And a matrix of (o,s)x(512) orientation values is obtained. Here, o is number of the octaves and s is number of intervals of octaves. This matrix is called the orientation scale-space (OSS) and is depicted in the right column of FIG. 6.

Using a descriptor around the key point, recognition tasks can be carried out with a beg-of-features based method. However when the texture of the image is low in detail, (e.g. a infrared (IR) image of a ship from a distance) descriptors provide little use. That's why silhouettes are usually preferred in these cases. Using such descriptors including three parameters, and extracting orientation sets belonging to the outline following steps (101) to (106), it is possible to generate a database including various outlines belonging to different shapes and it is possible to compare or match them. Furthermore, when a closed parametric outline curve is received, it is possible to compare its descriptor with all the descriptors in the database and determine what shape that outline belongs to. In a further step (107), a descriptor is compared with each previously recorded descriptor belonging to various outlines and at least one descriptor with a good match is found.

Depending on the curve fitting scheme, the starting point of the curve may differ, thus the method becomes variant under rotation of the silhouette. However this dependency is handled by a special representation. In step (106) a two dimensional (2D) image is generated as a radial descriptor using all the position, scale and orientation values of all sampled points. In this (2D) image the center point (C) represents the highest available scale value of the sampled points and scale values decrease radially as one moves towards the exterior in the direction (L). All extracted key points corresponds to a radial region on the descriptor image. Starting from a radial line, a rotation around the center point (C), in the direction (R) represents the curve parameter, starting and ending at the same place, and sampled points are placed as a dot (D) at a place matching their scale value and curve parameter. The two dimensional vectors representing the orientations are encoded with the color of the placed dot (D) in a preferred configuration. Moreover if the colors are chosen such that the hue changes with the rotation of the feature node along a continuous color wheel, the comparison in step (109) is further simplified as will be discussed below. For example when 0° and 360° is represented by red, 120° is pure green and 240° is pure blue and the regions in between are linearly interpolated a continuous color wheel is obtained. Here, values representing the orientation vector do not have to be colors and any value can be used to generate a two dimensional array as long as values are repeating from the beginning after reaching the maximum value (360° for our example). Colors are used to make the descriptors human-readable and this also makes the descriptors be encoded as usual colored red, green, blue (RGB) image files. (FIG. 7)

A rectangular descriptor can be used in one another embodiment of the invention (FIG. 8). In step (106) a two dimensional (2D) image is generated as a M*N rectangular descriptor using all the position, scale and orientation values of all sampled points. In this 2D image, horizontal axis (H) represents scale level values and vertical axis (V) represents curve parameters. The horizontal axis (H) gives the parametric positions of the orientation vectors. Assuming that the closed curve is parameterized with variable r[0,1], by quantizing r into M bins (36 in the preferred embodiment), the positions of orientation vectors distributed along the horizontal axis (H). The vertical axis (V) stands for the scale levels. Scale parameter is limited by the preferred number of octaves which is the number of OSS. Scale level values are quantized into N (18 in the preferred embodiment) bins and distributed along the vertical axis. The lowermost bin of the vertical axis represents the highest available scale parameter value and scale parameter decreases towards the upmost bin of the vertical axis. The color of a bin is decided according to the orientation angle $(0°>O(r)>2\pi°)$ of the point which the bin represents. By mapping $O(r)$ to the color circle (hue values), where $O(r)=0°=2\pi°$ corresponds to red in the preferred embodiment, the orientation angles are depicted. Thus the descriptor is fully saturated.

In step (107), when comparing two descriptors with all the feature parameters encoded as images of the same size, they are laid over each other matching the centers (highest scale number point) of the images and the orientation components are subtracted. This comparison is done for every possible rotation of each image on the other which will give possible positions of the feature points along the outline. Moreover, the orientation values of one array are also changed for every possible value with the same amount at each location and different feature point orientations are also considered. In the case of a color image, the colors of one image is changed according to the chosen color wheel which will give possible orientations of feature points, without altering their relative orientations since all values on the image are incremented or decremented the same amount. The pairs giving the least difference upon comparison will give the best match of the outline. Considering that the resolution required to generate such images is low, the matching process is fast enough to identify an outline in a large database.

It can be said that the descriptors are represented as radial arrays in which radial distance from the center represent the scale value of the sampled point, rotation around this center represents the outline curve parameter and the value at each point represent the orientation in step (106). Descriptor pairs are compared at every possible rotation around the same center using every possible relative feature orientation value, which is changed in a scheme in which orientation value represents the same feature orientation at two different values and incremented or decremented the same amount throughout one radial array and repeats upon reaching the highest or lowest value. This ensures that the relative orientations of features remain the same with a cycling value. In a preferred configuration, the radial array is encoded on a two dimensional color image.

Anyone who is proficient in the previous art should understand that using this method (100), descriptor of an outline, whose parametric equation is known, can be extracted to be compared with a list of descriptors invariant of scale and orientation. The input outline then can be identified or matched or a given outline can be searched in a database of descriptors representing different outlines of different objects using the method (100). Again, this database can be generated using some of the steps of method (100), namely steps (101) to (106). (FIG. 7)

A system for identifying scale invariant features of image outlines (1) fundamentally comprises:
- at least one feature and image database (2) configured to store outline descriptors and respective outlines together with original pixel images.
- at least one processing unit (3) connected to feature and image database (1) and configured to receive a parametric equation of an outline and implement the method for identifying scale invariant features of image outlines (100) using this curve as the input.

In a preferred embodiment of the present invention, processing unit (3) is configured to receive at least one parametric equation of a planar outline. Anyone proficient in the image processing field should understand that this system (1) and method (100) is applied on a sequence of pixel images and objects with outlines can be continuously monitored. In another embodiment of the present inventive system (1), processing unit (3) is configured to receive at least one image from a recorded or live video stream frame and have means to pre-process a two dimensional pixel image to acquire a planar closed parametric outline. Therefore, processing unit (3) is configured to be connectible to a camera, which is preferentially an infrared vision camera. (FIG. 5)

Upon reception of an outline, processing unit (3) is either use it to extract a descriptor as described above according to steps (101) to (106) and it is configured to store this outline, its descriptor and original image (if exists) in the feature and image database (2). When the further step (107) is executed, using the data in the feature and image database (2), the system (1) is able to compare the input outline with all the recorded outlines and find at least one result with a good match. As it is well-known in the previous art, the results can be output to any interface device showing the identified outline and/or image. This system (1) is applicable to any device which is intended to identify objects or shapes on 2D images using their outline features. The interface device can be any of a monitor, display or printer or the results are used as the input of any other processing system.

In conclusion, a reliable and efficient methodology to extract, represent and match silhouette image contour features independent of orientation, scale and resolution is obtained with this system (1) and method (100).

Within the scope of these basic concepts, it is possible to develop a wide variety of embodiments of the inventive "system and method for describing image outlines" (1), (100). The invention cannot be limited to the examples described herein; it is essentially according to the claims.

The invention claimed is:

1. A method for describing image outlines (100), the method comprising:
    receiving a parametric equation of a closed planar curve (101);
    choosing nodes on the closed planar curve with equal intervals (102);
    generating a continuous scale space of the nodes on the closed planar curve by successively convolving the closed planar curve with a Gaussian filter and down-sampling it after each octave (103);
    calculating a plurality of orientation vectors and an orientation angle values for each sampled point at each interval of each octave (104);
    creating a orientation scale space (OSS) which is a matrix obtained from stacking each orientation angle value on top of each other (105); and
    representing the outline with a descriptor including all the orientation vectors and their respective parameters position and scale (106).

2. The method of describing image outlines (100) according to claim 1, further comprising an image pre-processing operation, which is capable of generating a binary image from an input image and fitting a curve on the boundary of an object, wherein the image pre-processing operation is implemented before the step (101).

3. The method of describing image outlines (100) according to claim 1, wherein the closed planar curve is down-sampled into half in the step (103).

4. The method of describing image outlines (100) according to claim 1, wherein a continuous scale space is generated by convolving the planar curve with a Gaussian filter throughout each octave in the step (103).

5. The method of describing image outlines (100) according to claim 1, further comprising obtaining an orientation vector of a sampled point; wherein the orientation vector is a unit vector perpendicular to the tangential line at a point.

6. The method of describing image outlines (100) according to claim 1, further comprising a step of comparing a descriptor with each previously recorded descriptor belonging to various outlines and finding at least one descriptor with a good match (107).

7. The method of describing image outlines (100) according to claim 6, wherein in the step (106), the descriptors are represented as radial arrays in which radial distance from a center represent scale values, rotation around this center represents an outline curve parameter and the value at each point represents a sampled point orientation.

8. The method of describing images outlines (100) according to claim 7, wherein the radial array is encoded on a two dimensional color image representing the sampled point orientations are encoded with the color of a placed point in the step.

9. The method of describing image outlines (100) according to claim 7, further comprising comparing descriptor pairs by finding the difference at every possible rotation of radial arrays around the same center in the step.

10. The method of describing image outlines (100) according to claim 9, wherein one of the descriptors' orientation values is cyclically varied for at least one relative rotation of radial arrays in the step (107).

11. The method of describing image outlines (100) according to claim 1, further comprising generating a rectangular descriptor which uses all the position, scale and orientation values of all sampled points; and which has a preferred resolution (M*N) wherein horizontal axis (H) represents scale level values and vertical axis (V) represents curve parameters in the step (106).

12. The method of describing image outlines (100) according to claim 11, further comprising deciding color of a bin in a generated descriptor by mapping the orientation angle of the point which the bin represents to a color circle (hue values) in the step (106).

13. The method of describing image outlines (100) according to claim 12, wherein the descriptor pairs with the least difference upon comparison are fit for the best match in the step (107).

14. A system (1) of describing image outlines wherein:
    at least one feature and image database (2) is capable of storing outline descriptors determined by steps (101) to (106) as in claim 1, and respective outlines (100) are capable of together with original pixel images;
    at least one processing unit (3) is capable of being connected to the feature and image database (2); receiving a parametric equation of an outline (100); and implementing the describing image outline (100) as in claim 1, using this outline (100) as an input.

* * * * *